United States Patent [19]

Kuga

[11] Patent Number: 5,686,940
[45] Date of Patent: Nov. 11, 1997

[54] DISPLAY APPARATUS

[75] Inventor: Kaeko Kuga, Kyoto, Japan

[73] Assignee: Rohm Co., Ltd., Kyoto, Japan

[21] Appl. No.: 361,728

[22] Filed: Dec. 23, 1994

[30] Foreign Application Priority Data

Dec. 24, 1993 [JP] Japan ................. 5-325629
Dec. 27, 1993 [JP] Japan ................. 5-330163

[51] Int. Cl.⁶ .............................. G09G 5/00
[52] U.S. Cl. .............. 345/156; 345/127; 345/158; 345/159
[58] Field of Search .................. 345/156, 157, 345/158, 127

[56] References Cited

U.S. PATENT DOCUMENTS 5,010,324  4/1991  Yamamoto ............... 340/723
5,253,286  10/1993  Sano et al. ............. 379/53
5,288,078  2/1994  Capper et al. ........... 273/148
5,488,391  1/1996  Favot et al. ............ 345/156

FOREIGN PATENT DOCUMENTS 2186374  7/1990  Japan .................. G06G 5/00

*Primary Examiner*—Mark R. Powell
*Assistant Examiner*—Vincent E. Kovalick
*Attorney, Agent, or Firm*—Nikaido Marmelstein Murray & Oram LLP

[57] ABSTRACT

A distance sensor for detecting the distance between a display panel and an image viewer is provided on a display apparatus. An image signal supplied to the display panel is controlled based on the distance detected by the distance sensor to make a changeover between an enlarged image and a reduced image or between scrolling and stopping of a text or between moving and stationary display of a moving image. The speed of the scrolling and the speed of the moving display are stepwisely set according to the detected distance.

9 Claims, 4 Drawing Sheets

DISPLAY APPARATUS

BACKGROUND OF THE INVENTION

1. Field of the Invention

The present invention relates to a display apparatus such as a monitor of a personal computer and an operation panel.

2. Description of the Prior Art

Displaying information recorded on a recording medium on a display apparatus to process and edit the information while viewing a displayed image is very widely performed in various fields such as CAD (computer assisted design), word-processing and video tape editing. In such processing and editing, it is often necessary to change display modes, for example, between the enlarged image display and the reduced image display, between the scrolling and the stopping of the display screen and between the moving display and the stationary display of a moving image.

For example, in drawing a plan with a CAD system, the displayed image is reduced to view the entire plan, and the displayed image is partly enlarged to draw the details of the plan. In word-processing and computer programming, the displayed image is scrolled to display an edited portion of a long text. In editing a video tape, the image is fast-forwarded to quickly find an edited portion, and when the edited portion is approached, the portion is displayed at a low speed or a stationary image is displayed. The operations of the high-speed display, the low-speed display and the stationary image display are performed in reproducing a video tape to watch the video as well as in the editing of a video tape.

The change of displays is usually made by the user by operating an input means. For example, to specify an enlargement range with a CAD system, normally, a mouse is clicked several times. To display a desired portion of a text in word-processing, the display screen is scrolled by keeping pressing a scrolling key of the keyboard or by pressing a scrolling start key, and the scrolling is stopped by releasing the scrolling key or by pressing a scrolling stop key. In the moving image display of a video tape, keys such as a fast forward key, a low-speed reproduction key and a stationary display key are operated.

However, when the display modes are changed by such operations, delay is readily caused in the man to machine interface, and the operations themselves are complicated. In addition, the operations are sometimes very difficult for physically handicapped people.

SUMMARY OF THE INVENTION

An object of the present invention is to provide a display apparatus with which display modes are changed without any input operations.

To achieve the above-mentioned object, according to the present invention, a distance sensor is provided for detecting the distance between a display panel on which an image is displayed and an image viewer, and the displayed image is controlled by varying an image signal supplied to the display panel based on the distance detected by the distance sensor. The changeover between the enlargement and the reduction of an image and between the scrolling and the stopping of a text and between the moving display and the stationary display of a moving image is made according to the detected distance. The speed of the scrolling and the speed of the moving image display can stepwisely be set according to the detected distance.

Preferably, the distance detected by the distance sensor is the distance between the upper half of the viewer's body and the display panel. Thereby, the change of display is made by a very natural movement of the viewer that the upper half of the body is moved forward or backward.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
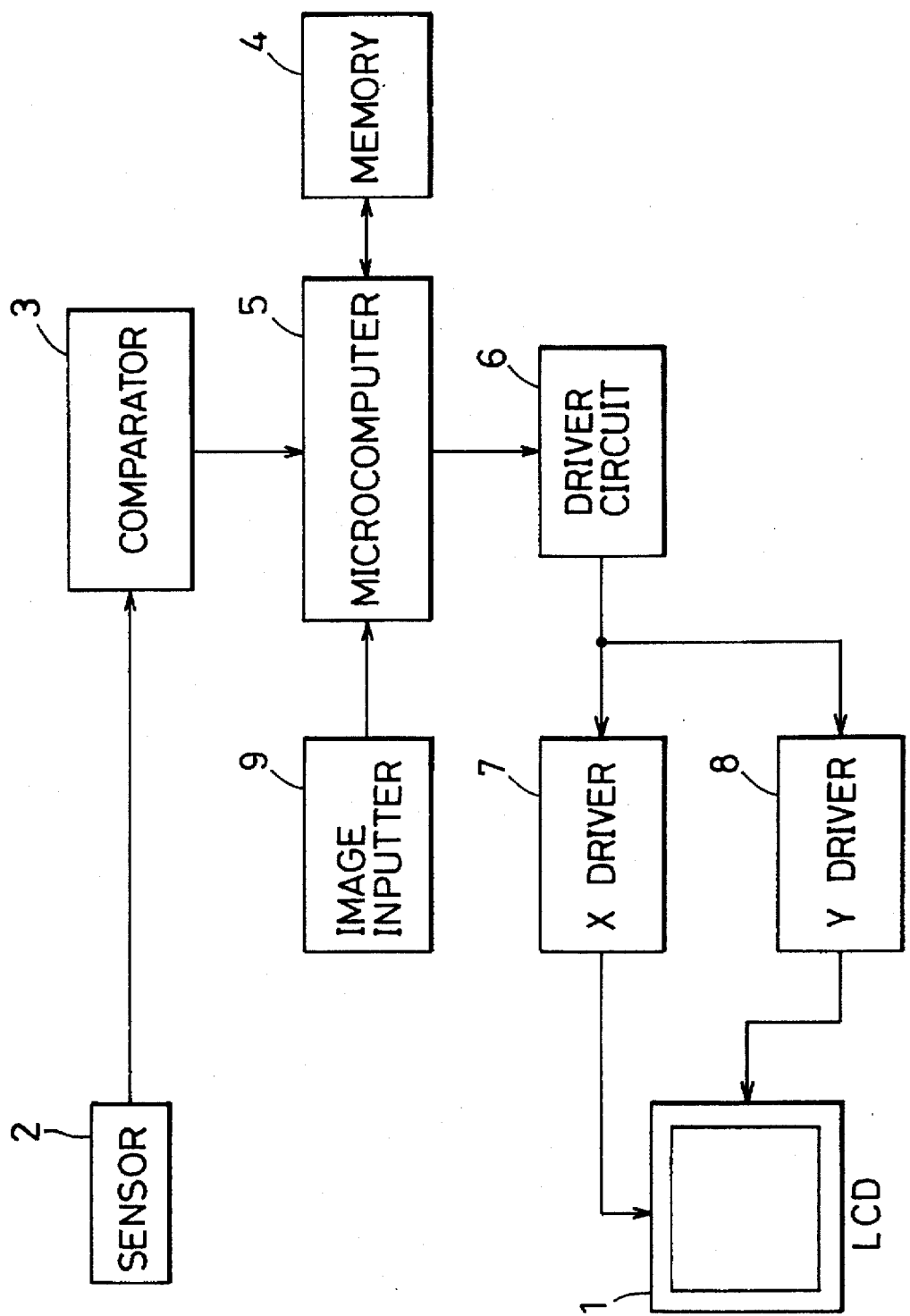
FIG. 1 is a block circuit diagram showing the arrangement of a first embodiment of the present invention.

Referring to the block diagram of FIG. 1, there is shown the arrangement of a first embodiment where the present invention is employed in a CAD system. In this embodiment, a liquid crystal display (LCD) 1 is used as the display panel. Reference numeral 2 represents a distance sensor which detects the distance between the user and the LCD 1. Reference numeral 3 represents a comparator which converts a signal of the distance sensor 2 into a high-level signal or a low-level signal. Reference numeral 4 represents a memory for storing image data, and comprises, for example, a non-volatile memory such as a ferroelectronic random access memory (FRAM) or an electrically erasable programmable read only memory (EEPROM). Reference numeral 5 represents a microcomputer which controls the entire system. Reference numeral 6 represents a driver circuit which drives the LCD 1. The driver circuit 6 supplies an image signal to the LCD 1 through an X driver 7 which outputs a horizontal signal and a Y driver 8 which outputs a vertical signal. Reference numeral 9 represents a figure image inputter including a keyboard and a mouse.

The distance sensor 2 comprises a charge coupled device (CCD) and is placed on the LCD 1. The distance sensor 2 detects light from the upper half of the user's body by the CCD, and outputs, as an analog voltage, the ratio of the number of pixels which detect light including a skin-color component to the total number of pixels. The distance sensor 2 detects light for 0.5 second and outputs the signal every 0.5 second. The comparator 3 outputs a high-level signal when the output voltage of the distance sensor 2 is equal to or above a predetermined value and outputs a low-level signal when the output voltage of the distance sensor 2 is below the predetermined value.

The predetermined value is set to a value corresponding to a condition where a user of standard physique is 50 cm distant from the LCD 1. When the CAD system is started by supplying electricity thereto, this value is used by the comparator 3. However, the value can be altered according to the user. For this purpose, the CAD system of the present embodiment is provided with a distance setting mode of 5 seconds. The system enters the distance setting mode every time a reset switch is operated. At the end of this mode, the distance sensor 2 detects light from the user for 0.5 second, and the output of the distance sensor 2 is employed by the comparator 3 as the predetermined value.

The system of the above-described arrangement operates in the following manner: Image data produced by the user by operating the image inputter 9 is stored in the memory 4 by the microcomputer 5. Since the memory 4 is rewritable and non-volatile, the image data are updated on occasion and held for a long period of time without any back-up power source. The image data stored in the memory 4 are read out by the microcomputer when necessary and output to the driver circuit 6. The image data output to the driver circuit 6 are displayed on the LCD 1 through the X driver 7 and the Y driver 8.

The user of the system performs the input operation using the image inputter 9 while facing the LCD 1 and viewing the displayed image on the LCD 1. At this time, if the user moves the upper half of his or her body forward or backward, the number of pixels which receive light from the face mainly including the skin-color component increases or decreases, so that the ratio of the number of pixels which detect skin-color component light to the total number of pixels varies. Thereby, the variation in distance between the LCD 1 and the upper half of the user's body is detected. Thus, by comparing an output of the distance sensor 2 with the predetermined value by the comparator 3, whether the upper half of the user's body is near the LCD 1 or far from the LCD 1 is detected.

Figure 2:
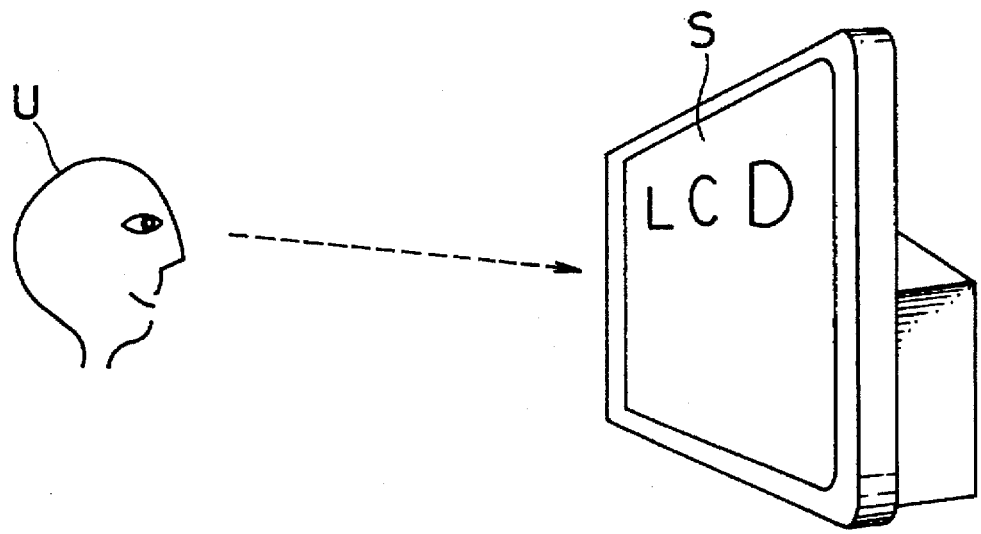
FIG. 2 shows a condition in which a reduced image is displayed in the first embodiment of the present invention.
Figure 3:
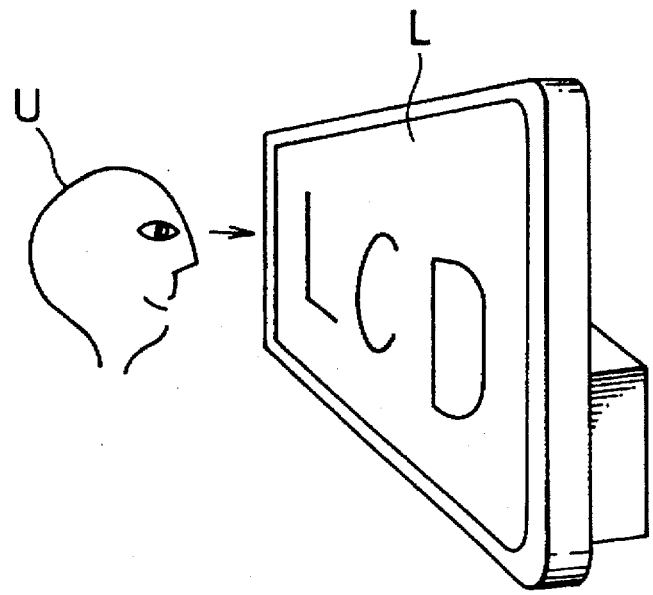
FIG. 3 shows a condition in which an enlarged image is displayed in the first embodiment of the present invention.

The microcomputer 5 makes a changeover between an enlarged image and a reduced image based on the output of the comparator 3. Specifically, when the output signal of the comparator 3 is of low level, the microcomputer 5 controls the driver circuit 6 so that all the image data are displayed, and when the output signal of the comparator 3 is of high level, the microcomputer 5 controls the driver circuit 6 so that a part of the image data is displayed being enlarged. The manner in which images are changed is shown in FIGS. 2 and 3. In FIG. 2, the distance between a user U and the LCD 1 is long, so that a reduced image S is displayed on the LCD 1. In FIG. 3, the distance between the user U and the LCD 1 is short, so that an enlarged image L is displayed on LCD 1.

The above-described changeover of images is made every time the level of the output of the comparator 3 is changed from high to low or from low to high. Thus, the changeover is made independently of the operation of the image inputter 9. Therefore, the changeover between the enlarged image display and the reduced image display is made in real time by the user only by moving the upper half of his or her body forward or backward.

While in this embodiment, the distance sensor 2 comprising the CCD is placed on the LCD 1 to detect the distance between the user and the LCD 1, a position sensing device (PSD) or an ultrasonic sensor may be used as the distance sensor. In this case, the distance sensor is arranged at a position suitable for each distance measuring method.

A second embodiment where the present invention is employed for word-processing will be described. While the arrangement of this embodiment is the same as that of the first embodiment of FIG. 1, the image data input by the image inputter 9 are not figure data but text data comprising letters, numbers and symbols. The text data are stored in the memory 4 and displayed on the LCD 1, and edited (addition, deletion, replacement, etc.) and updated on occasion.

In this embodiment, the microcomputer 5 controls the scrolling of the image displayed on the LCD 1 based on an output signal of the comparator 3. Specifically, when the output signal of the comparator 3 is of low level, the microcomputer 5 controls the driver circuit 6 so that the displayed image is scrolled, and when the output signal of the comparator 3 is of high level, the microcomputer 5 controls the driver circuit 6 so that the displayed image is stopped. Thus, a stationary image is displayed when the upper half of the user's body is near the LCD 1, and the displayed image is scrolled when the upper half of the user's body is far from the LCD 1.

The scrolling direction is set in advance so that the scrolling is performed from the beginning toward the end of text data. When the end of the text data is reached during scrolling, the display is returned to the beginning of the text data, and the scrolling is continued in the same direction. The scrolling direction can be changed so that the scrolling is performed from the end toward the beginning of text data by operating the image inputter 9. When the beginning of the text is reached during scrolling toward the beginning, the display is returned to the end of the text data and the scrolling is continued in the same direction.

By such a setting, a desired part of text data is readily displayed on the LCD 1 by the user by moving the upper half of his or her body away from the LCD 1 to scroll the displayed image and moving the upper body toward the LCD 1 to stop the scrolling.

A third embodiment of the present invention is also employed in word-processing. While in the second embodiment, the comparator 3 compares the output of the distance sensor 2 with one predetermined value to output a high-level signal or a low-level signal, in this embodiment, the comparator 3 outputs signals of three levels: a high-level signal, a middle-level signal and a low-level signal.

Specifically, the comparator 3 is provided with a first predetermined value and a second predetermined value which is lower than the first value. The comparator 3 outputs a high-level signal when the output of the distance sensor 2 is equal to or above the first predetermined value, outputs a middle-level signal when the output of the distance sensor 2 is below the first predetermined value but equal to or above the second predetermined value, and outputs a low-level signal when the output of the distance sensor 2 is below the second predetermined value. The first and the second predetermined values are set for distances of 45 cm and 60 cm, respectively. The microcomputer 5 controls the driver circuit 6 so that the stationary display, the low-speed scrolling and the high-speed scrolling are performed according to the high-level, middle-level and low-level signals.

With such an arrangement, the upper half of the user's body is moved away from the LCD 1 to perform the high-speed scrolling, and when a desired part of the displayed image is approached, the upper half is slightly moved toward the LCD 1 to perform the low-speed scrolling. When the desired part is displayed, the upper half is further moved toward the LCD 1 to stop the scrolling. Thus, the display of a desired portion of text data is very easy. The direction of the scrolling is the same as that of the second embodiment.

Figure 4:
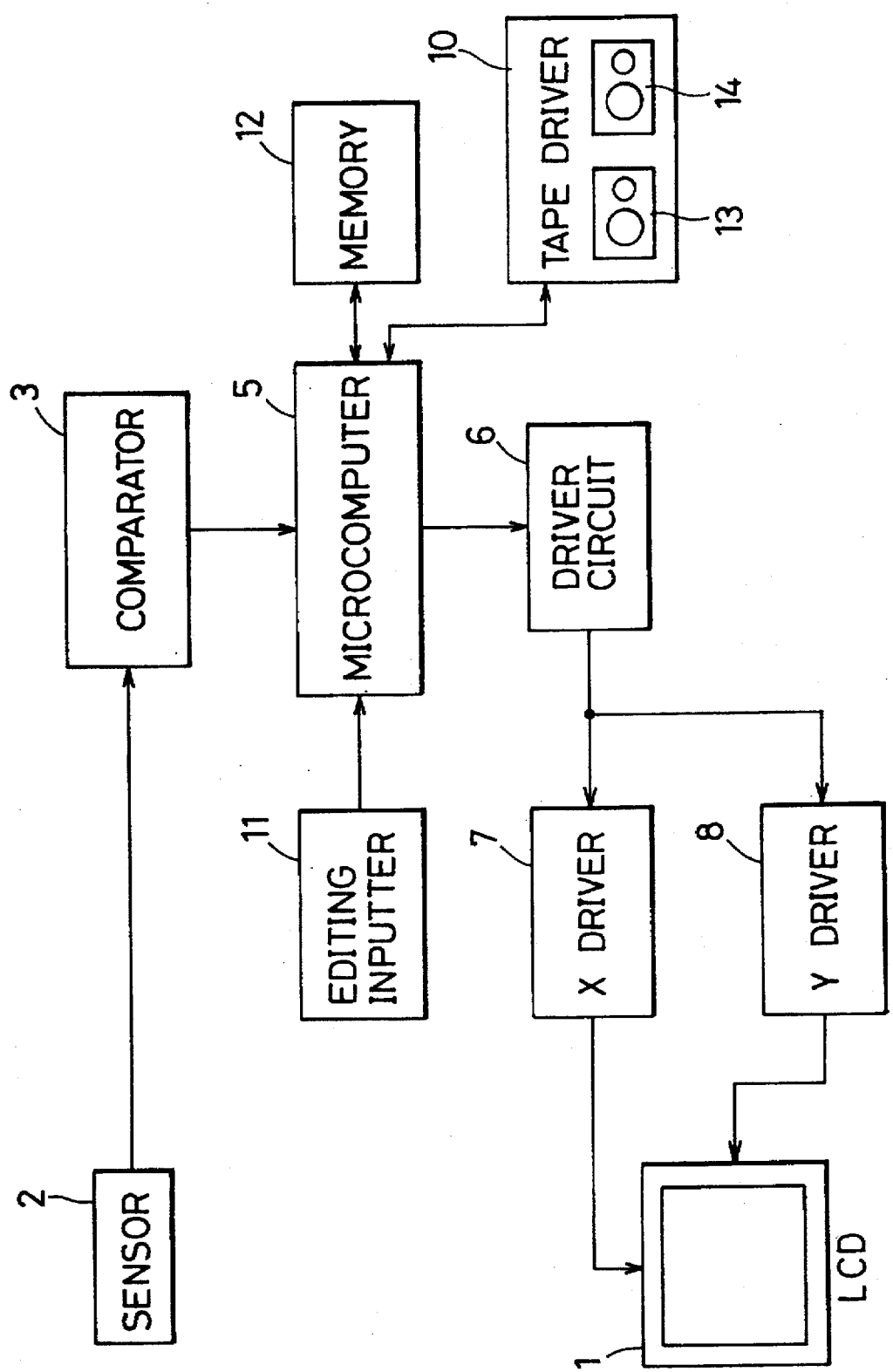
FIG. 4 is a block circuit diagram showing the arrangement of a fourth embodiment of the present invention.

Referring to the block diagram of FIG. 4, there is shown the arrangement of a fourth embodiment where the present invention is employed for the editing of video tapes. The LCD 1, the distance sensor 2, the comparator 3, the driver circuit 6, the X driver 7 and the Y driver 8 perform the same functions as those of the first embodiment. In this embodiment, a tape driver 10, an editing inputter 11 and a memory 12 are provided which are connected to the microcomputer 5 controlling the entire system.

The tape driver 10 drives a source tape 13 in which image data have been stored and a copy tape 14 for storing image data produced by editing the image data stored in the source tape 13. The image data are input to and output from the tapes 13 and 14 by the frame. The editing inputter 11 includes a keyboard provided with letter keys, number keys, symbol keys and command keys, and a mouse for inputting figures. The memory 12 is for temporarily storing the image data input by the editing inputter 11.

The system of the above-described arrangement operates in a copy mode, in a skip mode, in an input mode and in an overlay mode according to an operation of a command key of the editing inputter 11. In the copy mode, the image data are successively read out from the source tape 13 and displayed on the LCD 1, and the image data are written in the copy tape 14. In the skip mode, the image data are successively read out from the source tape 13 and displayed on the LCD 1, but the image data are not written in the copy tape 14. In the input mode, the driving of the tapes 13 and 14 by the tape driver 10 is not performed, and the image data of letters, numbers, symbols and figures are input by the editing inputter 11 and the input image data are displayed on the LCD 1 and stored in the memory 12. In the overlay mode, the image data produced in the input mode are read out from the memory 12 and superimposed on the image data successively read out from the source tape 13, and the superimposed image data are displayed on the LCD 1 and written in the copy tape 14.

The driving of the source tape 13 and the copy tape 14 in the copy and overlay modes and the driving of the source tape 13 in the skip mode are controlled based on the distance between the user and the LCD 1 detected by the distance sensor 2. When the distance between the user and the LCD 1 is long and a low-level signal is output from the comparator 3, the microcomputer 5 drives the tape driver 10 so that the image data in the source tape 13 are read out and displayed on the LCD 1. Thereby, a moving image is displayed. In the copy mode or overlay mode, the image data are written in the copy tape 14. When the distance between the user and the LCD 1 is short and a high-level signal is outputted from the comparator 3, the microcomputer 5 stops the tape driver 10, and the last frame data of the image data read out from the source tape 13 are repeatedly displayed. Thereby, a stationary image is displayed. In the copy or overlay mode, the writing in the copy tape 14 is stopped.

Figure 5:
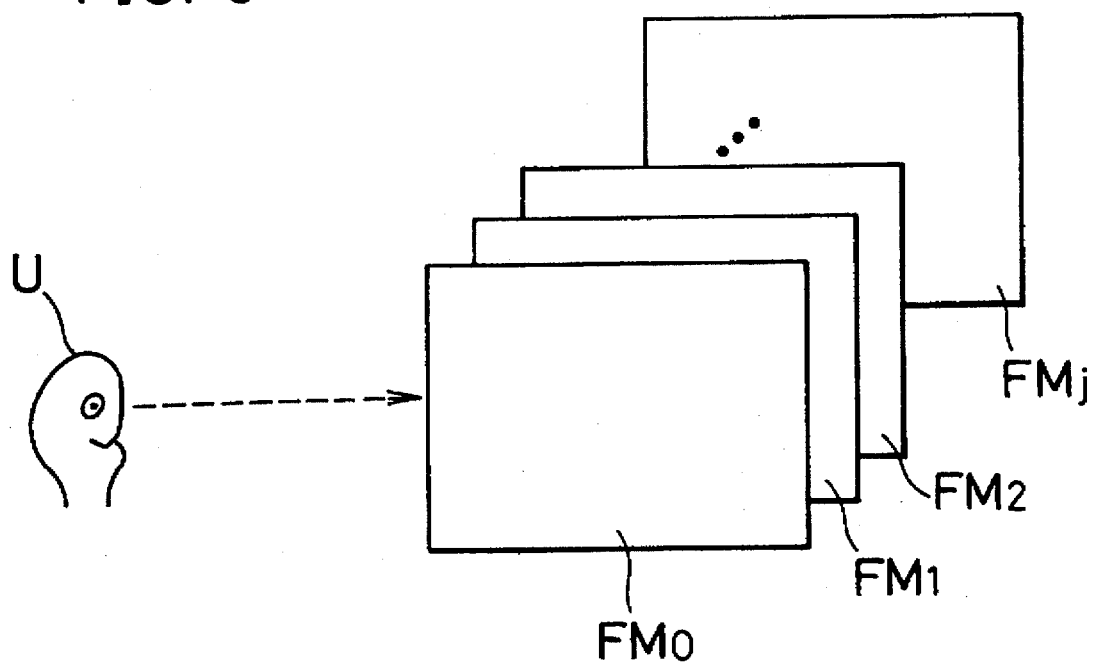
FIG. 5 shows a condition in which a moving image is displayed in the fourth embodiment of the present invention.
Figure 6:
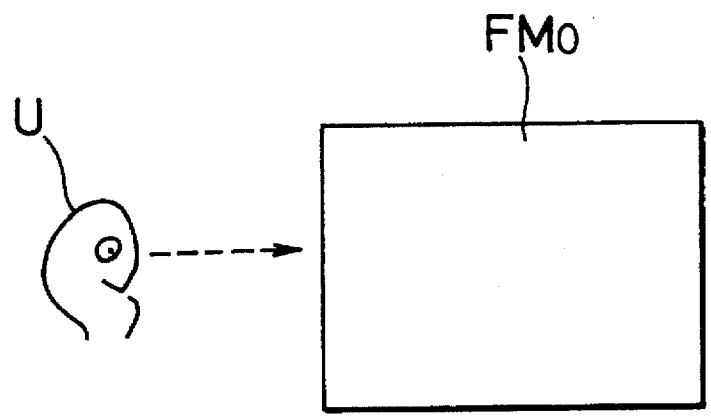
FIG. 6 shows a condition in which a stationary image is displayed in the fourth embodiment of the present invention.

Referring to FIGS. 5 and 6, there are shown the manners in which the image displayed on the LCD 1 is changed. In FIG. 5, the distance between the user U and the LCD 1 is long, so that frame data $FM_0$ to $FM_j$ displayed on the LCD 1 are continuously changed to display a moving image. In FIG. 6, the distance between the user U and the LCD 1 is short, so that the same frame data $FM_0$ is repeatedly displayed on the LCD 1 to display a stationary image.

The change of the image is made every time the level of the output of the comparator 3 is changed from high to low or from low to high. Therefore, the changeover between the moving image display and the stationary image display is made in real time by the user only by moving the upper half of his or her body forward or backward.

The fifth embodiment of the present invention is provided with two display speeds: a normal speed and a low speed, whereas the fourth embodiment is provided with a single display speed. While the arrangement of this embodiment is the same as that of FIG. 4, the comparator 3 outputs, like in the third embodiment, a high-level signal, a middle-level signal and a low-level signal. Specifically, the comparator 3 is provided with a first predetermined value and a second predetermined value which is lower than the first predetermined value. The comparator 3 outputs a high-level signal when the output of the distance sensor 2 is equal to or above the first predetermined value, outputs a middle-level signal when the output of the distance sensor 2 is below the first predetermined value but equal to or above the second predetermined value, and outputs a low-level signal when the output of the distance sensor 2 is below the second predetermined value.

The microcomputer 5 controls the tape driver 10 and the driver circuit 6 so that the stationary image display, the low-speed moving image display and the normal-speed moving image display are performed according to the high-level, middle-level and low-level signals. The manner of driving and stopping of the tapes 13 and 14 in the normal-speed moving image display and in the stationary image display, and the manner of the display are the same as those of the fourth embodiment.

When the middle-level signal is output from the comparator 3, the microcomputer 5 drives the tape driver 10 at a low speed and reads out the image data from the source tape 13. In the copy and overlay modes, the copy tape 14 is driven at the same speed, and the image data read out from the source tape 13 are written in the copy tape 14. When the source tape 13 is driven at a low speed, the number of frames of the image data read out per unit time is small compared to the case where the tape 13 is driven at a normal speed, so that the microcomputer 5 causes the driver circuit 6 to output the image signal of the same frame a number of times according to the speed ratio between the normal speed and the low speed. As a result, a smoothly moving image is displayed on the LCD 1 in the low-speed display.

According to such features, the upper half of the user's body is moved away from the LCD 1 to display an image moving at the normal speed, and when a desired part of the displayed image is approached, the upper half of the body is slightly moved toward the LCD 1 to display an image moving at the low speed, and when the desired part is displayed, the upper half of the body is further moved toward the LCD 1 to display a stationary image. Thus, it is very easy to find an edited part of the tape.

The methods of changing displayed images shown in the fourth and fifth embodiments may be employed not only in a video tape editing system but in a system used exclusively for reproduction.

As described above, according to the display apparatus of the present invention, it is unnecessary to operate an input means to change displayed images, so that the efficiency in drawing, writing and tape editing improves.

Obviously, many modifications and variations of the present invention are possible in light of the above teachings. It is therefore to be understood that within the scope of the appended claims, the invention may be practiced other than as specifically described.

What is claimed is:

1. A display apparatus for a moving image comprising:
   a display panel for displaying an image thereon on receipt of an image signal;
   storing means for storing information about a moving image, to be displayed on the display panel, therein;
   signal supplying means for outputting the information stored in the storing means to the display panel as the image signal;
   distance detecting means for detecting a distance between the display panel and an image viewer; and controlling means for controlling the output signal of the signal supplying means so that a moving image is displayed on the display panel when the distance detected by the distance detecting means is equal to or longer than a predetermined distance and that a stationary image is displayed on the display panel when the distance detected by the distance detecting means is shorter than the predetermined distance.

2. A display apparatus comprising:

a display panel for displaying an image thereon on receipt of an image signal;

storing means for storing information, to be displayed on the display panel, therein;

signal supplying means for outputting the information stored in the storing means to the display panel as the image signal;

distance detecting means for detecting a distance between the display panel and an image viewer; and controlling means for controlling the output signal of the signal supplying means so that an image displayed on the display panel is scrolled when the distance detected by the distance detecting means is equal to or longer than a predetermined distance and that the image displayed on the display panel is stationary when the distance detected by the distance detecting means is shorter than the predetermined distance.

3. A display apparatus according to claim 2, wherein said predetermined distance includes a first distance and a second distance which is shorter than the first distance, and wherein said controlling means controls the output signal of the signal supplying means so that an image displayed on the display panel is scrolled at a first speed when the distance detected by the distance detecting means is equal to or longer than the first distance, that the image displayed on the display panel is scrolled at a second speed which is lower than the first speed when the distance detected by the distance detecting means is shorter than the first distance but equal to or longer than the second distance, and that the image displayed on the display panel is stationary when the distance detected by the distance detecting means is shorter than the second distance.

4. A display apparatus according to claim 2, wherein said distance detecting means detects a distance between the display panel and an upper half of the image viewer's body.

5. A display apparatus according to claim 4, wherein said predetermined distance includes a first distance and a second distance which is shorter than the first distance, and wherein said controlling means controls the output signal of the signal supplying means so that a moving image which varies at a first speed is displayed on the display panel when the distance detected by the distance detecting means is equal to or longer than the first distance, that a moving image which varies at a second speed which is lower than the first speed is displayed on the display panel when the distance detected by the distance detecting means is shorter than the first distance but equal to or longer than the second distance, and that a stationary image is displayed on the display panel when the distance detected by the distance detecting means is shorter than the second distance.

6. An image editing apparatus comprising:

supplying means for supplying original images;

editing means for editing the original images based on an operation by a user and outputting edited images;

storing means for storing the original images or the edited images;

displaying means for displaying the original images or the edited images;

detecting means for detecting a distance between the displaying means and the user; and controlling means for controlling the supplying means, the editing means, the storing means and the displaying means based on the distance detected by the detecting means, said controlling means a) for commanding the supplying means to supply original images continuously, the storing means to store the original images continuously, and the display means to display the original images continuously, when the detected distance is equal to or longer than a predetermined distance, and b) for commanding the supplying means to supply a single original image, the editing means to edit the original imaged based on the operation of the user and to output an edited image, the storing means to store the edited image, and the display means to display the edited image, when the detected distance is shorter than the predetermined distance.

7. An image editing apparatus according to claim 6, wherein said predetermined distance includes a first distance and a second distance which is shorter than the first distance, and wherein said controlling means commands the supplying means to supply original images continuously at a first speed, when the detected distance is equal to or longer than the first distance, and commands the supplying means to supply original images continuously at a second speed which is lower than the first speed, when the detected distance is shorter than the first distance but equal to or longer than the second distance.

8. A display apparatus according to claim 4, wherein said distance detecting means detects a distance between the display panel and an upper half of the viewer's body.

9. An image editing apparatus according to claim 6, wherein said detecting means detects a distance between the displaying means and an upper half of the user's body.

* * * * *